United States Patent
Higuchi et al.

(10) Patent No.: US 6,739,986 B2
(45) Date of Patent: *May 25, 2004

(54) MULTI-PIECE SOLID GOLF BALL

(75) Inventors: Hiroshi Higuchi, Chichibu (JP);
Hirotaka Shimosaka, Chichibu (JP);
Yasushi Ichikawa, Chichibu (JP); Junji Umezawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 09/906,845

(22) Filed: Jul. 18, 2001

(65) Prior Publication Data

US 2002/0058553 A1 May 16, 2002

Related U.S. Application Data

(60) Provisional application No. 60/237,729, filed on Oct. 5, 2000.

(30) Foreign Application Priority Data

Sep. 11, 2000 (JP) .......................................... 2000-274960

(51) Int. Cl.⁷ .......................... A63B 37/12; A63B 37/14; A63B 37/00
(52) U.S. Cl. ........................................ 473/378; 473/351
(58) Field of Search ................................ 473/371, 354, 473/373, 357, 351, 365, 376, 377, 378, 379, 380, 381, 382, 383, 384

(56) References Cited

U.S. PATENT DOCUMENTS

| | | | |
|---|---|---|---|
| 5,253,871 A | 10/1993 | Viollaz | |
| 5,306,760 A | 4/1994 | Sullivan | |
| 5,312,857 A | 5/1994 | Sullivan | |
| 5,314,187 A | 5/1994 | Proudfit | |
| 5,439,227 A | 8/1995 | Egashira et al. | |
| 5,490,674 A | 2/1996 | Hamada et al. | |

(List continued on next page.)

FOREIGN PATENT DOCUMENTS

| | | |
|---|---|---|
| JP | 4-244174 | 9/1992 |
| JP | 6-142228 | 5/1994 |
| JP | 6-218078 | 8/1994 |
| JP | 6-343718 | 12/1994 |

(List continued on next page.)

Primary Examiner—Derris H. Banks
Assistant Examiner—Dimitry Suhol
(74) Attorney, Agent, or Firm—Sughrue Mion, PLLC

(57) ABSTRACT

In a multi-piece solid golf ball comprising a solid core and a cover of two inner and outer layers enclosing the solid core and formed on the surface with a plurality of dimples, the solid core in its entirety has a hardness distribution falling within the range of JIS-C hardness 50–85, the difference between maximum and minimum JIS-C hardnesses in the solid core falls within 5%, the cover inner layer has a JIS-C hardness of 70–90, the cover outer layer has a JIS-C hardness of 60–80, the sum of high-speed region dimple operative volumes HDOV of respective dimples is 170–310, the sum of low-speed region dimple operative volumes of respective dimples LDOV is 200–310, and the overall dimple volume is 260–360 mm³.

8 Claims, 1 Drawing Sheet

U.S. PATENT DOCUMENTS

| | | | | |
|---|---|---|---|---|
| 5,553,852 A | | 9/1996 | Higuchi et al. | |
| 5,556,098 A | | 9/1996 | Higuchi et al. | |
| 5,586,950 A | | 12/1996 | Endo | |
| 5,704,854 A | | 1/1998 | Higuchi et al. | |
| 5,713,802 A | * | 2/1998 | Moriyama et al. | 473/354 |
| 5,730,663 A | | 3/1998 | Tanaka et al. | |
| 5,779,563 A | | 7/1998 | Yamagishi et al. | |
| 5,782,707 A | | 7/1998 | Yamagishi et al. | |
| 5,792,009 A | * | 8/1998 | Maruko | 473/357 |
| 5,803,831 A | | 9/1998 | Sullivan et al. | |
| 5,899,822 A | | 5/1999 | Yamagishi et al. | |
| 6,004,226 A | | 12/1999 | Asakura | |
| 6,015,356 A | | 1/2000 | Sullivan et al. | |
| 6,100,321 A | | 8/2000 | Chen | |
| 6,123,628 A | * | 9/2000 | Ichikawa et al. | 156/146 |
| 6,267,694 B1 | * | 7/2001 | Higuchi et al. | 473/373 |
| 6,379,267 B1 | * | 4/2002 | Yamagishi et al. | 473/371 |
| 6,413,171 B1 | * | 7/2002 | Shimosaka | 473/351 |

FOREIGN PATENT DOCUMENTS

| | | |
|---|---|---|
| JP | 7-24084 | 1/1995 |
| JP | 7-24085 | 1/1995 |
| JP | 7-194735 | 8/1995 |
| JP | 7-194736 | 8/1995 |
| JP | 8-322962 | 12/1996 |
| JP | 9-10358 | 1/1997 |
| JP | 9-215775 | 8/1997 |
| JP | 9-239068 | 9/1997 |
| JP | 10-57523 | 3/1998 |
| JP | 10-151226 | 6/1998 |
| JP | 10-201880 | 8/1998 |
| JP | 10-216271 | 8/1998 |
| JP | 11-57067 | 3/1999 |
| JP | 11-104271 | 4/1999 |
| JP | 11-104273 | 4/1999 |
| WO | WO98/46671 | 10/1998 |

* cited by examiner

MULTI-PIECE SOLID GOLF BALL

CROSS REFERENCE TO RELATED APPLICATION

This application is an application filed under 35 U.S.C. §111(a) claiming benefit pursuant to 35 U.S.C §119(e)(i) of the filing date of the Provisional Application No. 60/237,729 filed on Oct. 5, 2000 pursuant to 35 U.S.C. §111(b).

BACKGROUND OF THE INVENTION

1. Field of the Invention

This invention relates to a multi-piece solid golf ball comprising a solid core and a cover of two inner and outer layers enclosing the solid core.

2. Prior Art

At present, golf balls of various structures have been proposed. A greater number of proposals are made on solid golf balls, especially multi-piece solid golf balls having a solid core enclosed with a cover of plural layers, so as to improve their travel distance, controllability or spin rate and feel when hit. See JP-A 4-244174, JP-A 6-142228, JP-A 7-24084, JP-A 7-24085, JP-A 9-10358, and JP-A 11-104273.

However, there is a desire to have a multi-piece solid golf ball having further improved flight performance, good spin properties, and a pleasant feel when hit with wood, iron and putter clubs as well as good scraping resistance and durability.

SUMMARY OF THE INVENTION

Making extensive investigations to meet the above demand, the inventor has found that a multi-piece solid golf ball comprising a solid core and a cover of two inner and outer layers enclosing the solid core and formed on the surface with a plurality of dimples is improved when the solid core in its entirety has a hardness distribution falling within the range of JIS-C hardness 50 to 85, the difference between maximum and minimum JIS-C hardnesses in the solid core falls within 5%, the cover inner layer has a JIS-C hardness of 70 to 90, the cover outer layer has a JIS-C hardness of 60 to 80, the sum of high-speed region dimple operative volumes HDOV of respective dimples is 170 to 310, the sum of low-speed region dimple operative volumes of respective dimples LDOV is 200 to 310, and the overall dimple volume is 260 to 360 mm$^3$.

Specifically, the invention provides a multi-piece solid golf ball as defined below.

(1) A multi-piece solid golf ball comprising a solid core and a cover of two inner and outer layers enclosing the solid core and formed on the surface with a plurality of dimples, wherein the solid core in its entirety has a hardness distribution falling within the range of JIS-C hardness 50 to 85, the difference between maximum and minimum JIS-C hardnesses in the solid core falls within 5%, the cover inner layer has a JIS-C hardness of 70 to 90, the cover outer layer has a JIS-C hardness of 60 to 80, the sum of high-speed region dimple operative volumes HDOV of respective dimples is 170 to 310, the sum of low-speed region dimple operative volumes of respective dimples LDOV is 200 to 310, and the overall dimple volume is 260 to 360 mm$^3$. mm$^3$.

(2) The multi-piece solid golf ball of claim 1 wherein provided that (a) represents a surface JIS-C hardness of the core, (b) represents the JIS-C hardness of the cover inner layer, and (c) represents the JIS-C hardness of the cover outer layer, they satisfy the relationship: (a)$\leq$(b)$\geq$(c).

(3) The multi-piece solid golf ball of claim 1 or 2 wherein the solid core has a specific gravity of 1.0 to 1.3, the cover inner layer has a specific gravity of 0.8 to 1.2, and the cover outer layer has a specific gravity of 0.9 to 1.3.

(4) The multi-piece solid golf ball of any one of claims 1 to 3 wherein the cover inner layer and/or cover outer layer is mainly formed of a thermoplastic resin.

(5) The multi-piece solid golf ball of any one of claims 1 to 4 wherein the cover outer layer is mainly formed of a thermoplastic polyurethane elastomer obtained using an aromatic or aliphatic diisocyanate.

(6) The multi-piece solid golf ball of any one of claims 1 to 5 wherein the cover outer layer is mainly formed of the reaction product of a thermoplastic polyurethane elastomer with an isocyanate compound.

(7) The multi-piece solid golf ball of any one of claims 1 to 6 wherein the cover inner layer is mainly formed of an ionomer resin or an ionomer resin and an olefinic elastomer.

The golf ball of the invention has a stretching flight performance along a relatively low trajectory, an increased travel distance, ease of control on iron shots, and a pleasant feel when hit with wood, iron and putter clubs, and is resistant to scraping and durable upon control shots with an iron club.

The multi-piece solid golf ball of the invention gives a tight comfortable feel and good rebound owing to the hardness distribution of the entire core optimized by minimizing the difference between maximum and minimum JIS-C hardnesses in the hardness distribution of the core. Additionally, the relatively soft cover inner layer and the cover outer layer are properly combined and the dimples are optimized, and so the golf ball has the improved flight performance including a relatively low trajectory which is elongated near its fall, less sensitivity to wind when hit with a driver, and an increased run, satisfying the playability needed by players of varying head speeds.

DETAILED DESCRIPTION OF THE INVENTION

Figure 1:
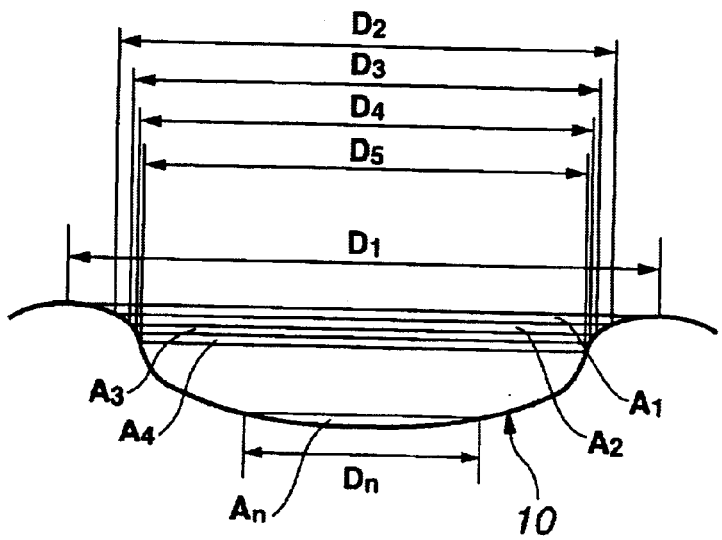
FIG. 1 is a diagram illustrating how to calculate HDOV and LDOV according to the present invention.

The invention is now described in more detail.

The multi-piece solid golf ball of the invention includes a solid core and a cover of two layer structure consisting of inner and outer layers enclosing the solid core.

The solid core is preferably formed of a rubber composition. The rubber composition used herein is preferably one using polybutadiene as a base rubber. The preferred polybutadiene is 1,4-cis-polybutadiene containing at least 40% cis-configuration. In the base rubber, natural rubber, polyisoprene rubber, styrene-butadiene rubber or the like can be blended with the polybutadiene, if desired. Increasing the rubber component improves the rebound of the golf ball.

In the rubber composition, a crosslinking agent can be blended which is selected from zinc and magnesium salts of unsaturated fatty acids such as zinc dimethacrylate and zinc diacrylate and ester compounds such as trimethylolpropane methacrylate, with zinc diacrylate being especially preferred. An appropriate amount of the crosslinking agent blended is at least 10 parts, especially at least 20 parts by weight per 100 parts by weight of the base rubber, with the upper limit being up to 50 parts, especially up to 45 parts by weight.

A vulcanizing agent is typically blended in the rubber composition. It is recommended that the vulcanizing agent include a peroxide whose temperature corresponding to a half-life of 1 minute is up to 155° C. The content of the peroxide is at least 30%, especially at least 40% by weight based on the entire vulcanizing agent, and its upper limit is preferably up to 70% by weight, though not critical. Such peroxides are commercially available, for example, under the trade name of Perhexa 3M and Percumyl D (NOF K.K.), Luperco 231XL and Luperco 101XL (Elf Atochem). An appropriate amount of the vulcanizing agent blended is at least 0.2 part, especially at least 0.6 part by weight per 100 parts by weight of the base rubber, with the upper limit being up to 2.0 parts, especially up to 1.5 parts by weight.

Further, an antioxidant and a filler for modifying specific gravity such as zinc oxide or barium sulfate can be blended if necessary.

The solid core composition is obtained by blending the above components. The solid core is manufactured by milling the composition in a conventional blending apparatus such as a Banbury mixer or roll mill, and compression or injection molding in a core-forming mold, where the molded part is cured by heating at a sufficient temperature for the crosslinking and co-crosslinking agents to act, for example, about 100 to 170° C., especially 130 to 160° C. for about 10 to 60 minutes, especially about 15 to 40 minutes in an example where dicumyl peroxide is used as the crosslinking agent and zinc diacrylate is used as the co-crosslinking agent, so as to provide a prescribed hardness distribution to the solid core. As the case may be, two-stage vulcanization is applicable.

The solid core is manufactured by vulcanizing and curing the above rubber composition in a conventional manner while the diameter of the solid core is preferably at least 30 mm, more preferably at least 33 mm, further preferably at least 35 mm and up to 40 mm, more preferably up to 39 mm, further preferably up to 38 mm.

The solid core according to the invention has an optimized hardness distribution, by virtue of which the ball is given a tight comfortable feel and good rebound. More particularly, when the solid core is measured for hardness at different positions on its cross section, the solid core in its entirety should have such a hardness distribution that the JIS-C hardness at any position fall in the range of at least 50, preferably at least 55, more preferably at least 60, and especially at least 63, and up to 85, preferably up to 83, more preferably up to 80, and especially up to 78.

Additionally, the solid core according to the invention requires that the difference between maximum and minimum JIS-C hardnesses in the above-defined hardness range of the solid core fall within 5%, preferably within 4%, more preferably within 3%, and especially within 2%. Herein the "hardness difference" within 5% designates the percent based on the minimum hardness of the difference between maximum and minimum hardnesses. Too large a hardness difference tends to exacerbate the feel on actual shots and the durability of the ball. It is noted that for the determination of maximum and minimum, JIS-C hardness is measured at positions including at least the core center, a position spaced 10 mm from the core center, and the core surface.

For the solid core according to the invention, it is recommended to optimize the hardness at the core surface and the hardness difference between the cover inner and outer layers. Specifically, the solid core is recommended to have a surface JIS-C hardness of at least 50, preferably at least 55, more preferably at least 60, and most preferably at least 63 and up to 85, preferably up to 83, more preferably up to 80, and most preferably up to 78. The hardness relation between the cover inner and outer layers will be described later.

The solid core preferably has a specific gravity of at least 1.0, more preferably at least 1.05 and further preferably at least 1.1, while its upper limit is preferably up to 1.3, more preferably up to 1.25, and further preferably up to 1.2.

In the present invention, the cover inner and outer layers are preferably formed of materials based on thermoplastic resins, though not limited thereto. The thermoplastic resins used herein include well-known thermoplastic resins and thermoplastic elastomers, for example, nylon, polyarylates, ionomer resins, polypropylene resins, thermoplastic polyurethane elastomers, and thermoplastic polyester elastomers. Commercially available examples are Surlyn 7930 and 8945 (E. I. Dupont, ionomer resins), Himilan 1557, 1605, 1706, 1707 and AM7311 (Dupont-Mitsui Polychemical K.K., ionomer resins), Rilsan BMNO (Elf Atochem, polyamide resin), and U Polymer U-8000 (Unitika K.K., polyarylate resin).

In the practice of the invention, the cover inner layer is preferably formed of a material based on a resinous component consisting of an ionomer resin or an ionomer resin and an olefinic elastomer.

Herein, mixing the ionomer resin with the olefinic elastomer achieves improved properties (e.g., feel and resilience) which are never achieved when they are used alone. Examples of the olefinic elastomer are linear low-density polyethylene, low-density polyethylene, high-density polyethylene, polypropylene, rubber-reinforced olefin polymers, flexomers, plastomers, thermoplastic elastomers (styrene block copolymers and hydrogenated polybutadiene-ethylene-propylene rubber) including acid modified ones, dynamically vulcanized elastomers, ethylene acrylate, ethylene vinyl acetate, and ethylene-methacrylic acid-acrylic acid terpolymers. Commercially available are, for example, HPR and Nucrel by Dupont-Mitsui Polychemical K.K. and Dynalon by JSR.

The mixing proportion of the ionomer resin and the olefinic elastomer is desirably from 40:60 to 95:5, more desirably from 45:55 to 90:10, further desirably from 48:52 to 88:12, and most desirably from 55:45 to 85:15 in weight ratio. Too low a proportion of the olefinic elastomer may result in a hard feel whereas too high a proportion may lead to a resilience decline.

The ionomer resins used herein are those of the ion-neutralized type such as with Zn, Mg, Na and Li. It is recommended that a Zn or Mg ion-neutralized type ionomer resin featuring moderate softness and high resilience be included in an amount of at least 5%, preferably at least 10% and more preferably at least 15% by weight and up to 100%, preferably up to 80%, and more preferably up to 70% by weight.

In the cover inner layer material, another polymer may be blended insofar as it does not compromise the benefits of the invention.

The cover inner layer material may contain about 30% by weight or less of inorganic fillers such as zinc oxide, barium sulfate and titanium dioxide. The preferred amount of the filler blended is at least 1% by weight and up to 20% by weight.

The cover inner layer preferably has a specific gravity of at least 0.8, more preferably at least 0.9, further preferably at least 0.92, and most preferably at least 0.93 and up to 1.2, more preferably up to 1.16, further preferably up to 1.1, and most preferably up to 1.05.

It is noted that the cover inner layer preferably has a gage of at least 0.5 mm, more preferably at least 0.9 mm, and further preferably at least 1.1 mm while its upper limit is recommended to be up to 3.0 mm, more preferably up to 2.5 mm, and further preferably up to 2.0 mm.

In the practice of the invention, the cover outer layer is preferably formed of materials based on thermoplastic polyurethane elastomers or ionomer resins. The thermoplastic polyurethane elastomer used herein has a molecular structure consisting of a high molecular weight polyol compound constituting a soft segment, a monomolecular chain extender constituting a hard segment, and a diisocyanate.

The high molecular weight polyol compound is not critical and may be any of polyester polyols, polyether polyols, copolyester polyols, and polycarbonate polyols. Exemplary polyester polyols include polycaprolactone glycol, poly(ethylene-1,4-adipate) glycol, and poly(butylene-1,4-adipate) glycol; an exemplary copolyester polyol is poly(diethylene glycol adipate) glycol; an exemplary polycarbonate polyol is (hexanediol-1,6-carbonate) glycol; and an exemplary polyether polyol is polyoxytetramethylene glycol. Their number average molecular weight is about 600 to 5,000, preferably about 1,000 to 3,000.

As the diisocyanate, aliphatic diisocyanates are preferably used in consideration of the yellowing resistance of the cover. Examples include hexamethylene diisocyanate (HDI), 2,2,4- or 2,4,4-trimethylhexamethylene diisocyanate (TMDI), and lysine diisocyanate (LDI). HDI is especially preferred for its compatibility with another resin upon blending.

The monomolecular chain extender is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDA), and isophoronediamine (IPDA).

Of the above-mentioned thermoplastic polyurethane elastomers, those having a tan δ peak temperature of not higher than −15° C., especially not higher than −16° C., and not lower than −50° C. as determined by viscoelasticity measurement are preferred for softness and resilience.

As the thermoplastic polyurethane elastomer, there may be used commercially available ones whose diisocyanate component is aliphatic, for example, Pandex TR3080, T7298, T7295, and T7890 from Bayer-DIC Polymer K.K.

The reaction product of the thermoplastic polyurethane elastomer mentioned above with an isocyanate compound to be described later is also useful whereby a further improvement is made in the surface durability upon iron shots.

The isocyanate compound used herein may be any of isocyanate compounds conventionally used in the prior polyurethane art. Although the isocyanate compound is not limited to the following examples, aromatic isocyanate compounds include 2,4-toluene diisocyanate, 2,6-toluene diisocyanate, a mixture of 2,4-toluene diisocyanate and 2,6-toluene diisocyanate, 4,4-diphenylmethane diisocyanate, m-phenylene diisocyanate and 4,4'-biphenyl diisocyanate. Hydrogenated products of these aromatic isocyanates such as dicyclohexylmethane diisocyanate are also useful. Additionally, aliphatic diisocyanates such as tetramethylene diisocyanate, hexamethylene diisocyanate (HDI), and octamethylene diisocyanate are useful as well as alicyclic diisocyanates such as xylene diisocyanate.

Other useful examples of the isocyanate compound include blocked isocyanate compounds obtained by reacting a compound having at least two isocyanate groups at ends with a compound having active hydrogen and uretidione compounds resulting from dimerization of isocyanate.

The amount of the isocyanate compound blended is usually at least 0.1 part, preferably at least 0.2 part, more preferably at least 0.3 part by weight per 100 parts by weight of the thermoplastic polyurethane elastomer while its upper limit is up to 10 parts, preferably up to 5 parts, and more preferably up to 3 parts by weight. Too small amounts of the isocyanate compound may fail to provide sufficient crosslinking reaction and a noticeable physical improvement whereas too large amounts may cause problems such as substantial discoloration by aging, heating and UV, a thermoplasticity loss and a resilience decline.

As noted above, the cover outer layer may also be formed of an ionomer resin. The cover outer layer can be formed of materials based on ionomer resins commonly used in conventional solid golf ball cover stock. Illustrative examples of the ionomer resin include Himilan 1855 (Dupont-Mitsui Polychemical K.K.) and Surlyn 8120, 8320 and 6320 (E. I. Dupont), and a combination of two or more ionomer resins is acceptable. If necessary, the ionomer resin may be compounded with well-known additives such as pigments, dispersants, antioxidants, UV absorbers, UV stabilizers, and plasticizers. The cover outer layer material may contain an inorganic filler such as zinc oxide, barium sulfate or titanium dioxide in an amount of at least 1%, especially at least 1.5% by weight and up to 30%, especially up to 20% by weight.

The cover outer layer preferably has a specific gravity of at least 0.9, preferably at least 0.95 and more preferably at least 1.0 and ranges up to 1.30, preferably up to 1.25 and more preferably up to 1.22.

The cover outer layer preferably has a gage of at least 0.5 mm, more preferably at least 0.9 mm, and further preferably at least 1.1 mm while its upper limit is recommended to be up to 2.5 mm, more preferably up to 2.3 mm, and further preferably up to 2.0 mm.

Herein, the total gage of the cover inner and outer layers, that is, the gage of the overall cover is usually at least 1.0 mm, preferably at least 1.5 mm, and more preferably at least 2.0 mm, while its upper limit is recommended to be up to 5.5 mm, preferably up to 4.5 mm, and more preferably up to 3.5 mm.

According to the invention, the cover inner layer should have a JIS-C hardness of at least 70, preferably at least 73, more preferably at least 75, further preferably at least 77, and most preferably at least 80 and up to 90, preferably up to 89, more preferably up to 88, further preferably up to 86, and most preferably up to 84. A too soft cover inner layer lacks resilience whereas a too hard layer causes a hard feel.

The cover outer layer should have a JIS-C hardness of at least 60, preferably at least 63, more preferably at least 65, further preferably at least 68, and most preferably at least 70 and up to 80, preferably up to 79, more preferably up to 78, further preferably up to 77, and most preferably up to 76. A too soft cover outer layer leads to much spin receptivity, a resilience decline and a distance reduction whereas a too hard layer causes a hard feel and poor spin performance. The hardness of the cover outer layer is preferably lower than the hardness of the cover inner layer.

It is recommended in the invention that JIS-C hardness be optimized among the core surface, the cover inner layer and the cover outer layer. Provided that (a) represents a surface JIS-C hardness of the core, (b) represents the JIS-C hardness of the cover inner layer, and (c) represents the JIS-C hardness of the cover outer layer, these parameters should preferably satisfy the relationship: (a)≦(b)≧(c). Outside this relationship, the ball may become worsened in feel upon hitting, and degraded in controllability and durability.

Between the cover inner and outer layers, an adhesive layer may be provided for the purpose of improving the durability upon hitting. The adhesive used herein may be selected from epoxy resin base adhesives, vinyl resin base adhesives, rubber base adhesives and the like. In particular, urethane resin base adhesives and chlorinated polyolefin base adhesives are preferably used. Commercially available products which are advantageously used herein are Resamine D6208 (Dainichi Seika Kogyo K.K., urethane resin base adhesive) and RB182 Primer (Nippon Bee Chemical K.K., chlorinated polyolefin base adhesive).

Herein, the adhesive layer can be formed by dispersion coating. The type of emulsion used in dispersion coating is not critical. The resin powder used in preparing the emulsion may be either a thermoplastic resin powder or a thermosetting resin powder. For example, vinyl acetate resins, vinyl acetate copolymer resins, EVA (ethylene-vinyl acetate copolymer) resins, acrylate (co)polymer resins, epoxy resins, thermosetting urethane resins, and thermoplastic urethane resins are useful. Of these, epoxy resins, thermosetting urethane resins, thermoplastic urethane resins and acrylate (co)polymer resins are preferred, with the thermoplastic urethane resins being most preferred.

It is noted that the adhesive layer preferably has a gage of at least 0.1 μm, more preferably at least 0.2 μm, and especially at least 0.3 μm, while its upper limit is up to 30 μm, more preferably up to 25 μm, and especially up to 20 μm.

The golf ball of the invention has a plurality of dimples formed in its surface. The sum of high-speed region dimple operative volumes HDOV of respective dimples as calculated by the following method is at least 170, preferably at least 175, more preferably at least 180 and up to 310, preferably up to 300, more preferably up to 290. It is understood that the high-speed region dimple operative volume of an individual dimple is designated HDOV, and the sum of these volumes is designated overall HDOV.

Method of Calculating a High-Speed Region Dimple Operative Volume

It is assumed that a dimple has a diameter $D_1$ (mm). A diameter range $R_1$ containing the diameter $D_1$ is determined from Table 1. The dimple is horizontally sliced at the position of a depth corresponding to a diameter $D_2$ (mm) equal to the lower limit of the diameter range $R_1$, to define a first slice zone $A_1$ of flat frustoconical shape having the diameters $D_1$ and $D_2$. The volume (mm³) of the slice zone $A_1$ is multiplied by a coefficient $\alpha_1$ corresponding to the diameter range $R_1$ given in Table 1 to calculate a first imaginary slice volume $V_1$ (mm³). Next, the dimple is horizontally sliced at the position of a depth corresponding to a diameter $D_3$ (mm) equal to the lower limit of the diameter range $R_2$ which is given one row below the preceding diameter range $R_1$ in Table 1, to define a second slice zone $A_2$ of flat frustoconical shape having the diameters $D_2$ and $D_3$. The volume (mm³) of the slice zone $A_2$ is multiplied by a coefficient $\alpha_2$ corresponding to the diameter range $R_2$ given in Table 1 to calculate a second imaginary slice volume $V_2$ (mm³). Calculation is similarly repeated until the volume (mm³) of the slice zone $A_n$ associated with the final diameter range $R_n$ with a diameter of less than 2 mm is multiplied by a coefficient $\alpha_n$ corresponding to the diameter range $R_n$ to calculate a n-th imaginary slice volume $V_n$ (mm³). The foregoing imaginary slice volumes are summed to give the high-speed region dimple operative volume HDOV.

$$HDOV\ (mm^3)=V_1+V_2+\ldots+V_n$$

TABLE 1

Coefficients for the calculation of dimple operative volumes

| No. | Diameter range R (mm) | Coefficient α |
|---|---|---|
| 1 | ≧4.4 | 1.00 |
| 2 | 4.2–4.4 | 1.00 |
| 3 | 4.0–4.2 | 1.00 |
| 4 | 3.8–4.0 | 1.00 |
| 5 | 3.6–3.8 | 0.95 |
| 6 | 3.4–3.6 | 0.90 |
| 7 | 3.2–3.4 | 0.85 |
| 8 | 3.0–3.2 | 0.80 |
| 9 | 2.8–3.0 | 0.70 |
| 10 | 2.6–2.8 | 0.60 |
| 11 | 2.4–2.6 | 0.50 |
| 12 | 2.2–2.4 | 0.40 |
| 13 | 2.0–2.2 | 0.30 |
| 14 | ≦2.0 | 0.20 |

An overall HDOV below the above-defined range allows the ball to sky when hit at high head speeds whereas an overall HDOV above the above-defined range yields a low trajectory. Either case leads to a shortage of flight distance.

According to the invention, the sum of low-speed region dimple operative volumes LDOV of respective dimples as calculated by the following method is at least 200, preferably at least 210, more preferably at least 220, especially at least 230 and up to 310, preferably up to 300, more preferably up to 290. It is understood that the low-speed region dimple operative volume of an individual dimple is designated LDOV, and the sum of these volumes is designated overall LDOV.

Method of Calculating a Low-Speed Region Dimple Operative Volume

It is assumed that a dimple has a diameter $D_1$ (mm). A diameter range $R_1$ containing the diameter $D_1$ is determined from Table 2. The dimple is horizontally sliced at the position of a depth corresponding to a diameter $D_2$ (mm) equal to the lower limit of the diameter range $R_1$, to define a first slice zone $A_1$ of flat frustoconical shape having the diameters $D_1$ and $D_2$. The volume (mm³) of the slice zone $A_1$ is multiplied by a coefficient $\beta_1$ corresponding to the diameter range $R_1$ given in Table 2, to calculate a first imaginary slice volume $v_1$ (mm³). Next the dimple is horizontally sliced at the position of a depth corresponding to a diameter $D_3$ (mm) equal to the lower limit of the diameter range $R_2$ which is given one row below the preceding diameter range $R_1$ in Table 2, to define a second slice zone $A_2$ of flat frustoconical shape having the diameters $D_2$ and $D_3$. The volume (mm³) of the slice zone $A_2$ is multiplied by a coefficient $\beta_2$ corresponding to the diameter range $R_2$ given in Table 2 to calculate a second imaginary slice volume $v_2$ (mm³). The calculation is repeated until the volume (mm³) of the slice zone $A_n$ associated with the final diameter range $R_n$ with a diameter of less than 2 mm is multiplied by a coefficient $\beta_n$ corresponding to the diameter range $R_n$ to calculate a n-th imaginary slice volume $v_n$ (mm³). The foregoing imaginary slice volumes are summed to give the low-speed region dimple operative volume LDOV.

$$LDOV\ (mm^3) = v_1 + v_2 + \ldots + v_n$$

TABLE 2

Coefficients for the calculation of dimple operative volumes

| No. | Diameter range R (mm) | Coefficient β |
|---|---|---|
| 1 | ≧4.4 | 0.10 |
| 2 | 4.2–4.4 | 0.20 |
| 3 | 4.0–4.2 | 0.40 |
| 4 | 3.8–4.0 | 0.60 |
| 5 | 3.6–3.8 | 0.70 |
| 6 | 3.4–3.6 | 0.80 |
| 7 | 3.2–3.4 | 0.90 |
| 8 | 3.0–3.2 | 0.95 |
| 9 | 2.8–3.0 | 1.00 |
| 10 | 2.6–2.8 | 1.00 |
| 11 | 2.4–2.6 | 0.90 |
| 12 | 2.2–2.4 | 0.80 |
| 13 | 2.0–2.2 | 0.70 |
| 14 | ≦2.0 | 0.50 |

It is likely to occur that an overall LDOV below the above-defined range allows the ball to sky when hit at low head speeds whereas an overall LDOV above the above-defined range yields a low trajectory and a short flight distance.

Further, the ratio of the overall HDOV to the overall LDOV is preferably at least 0.75, especially at least 0.76 and up to 0.93, especially up to 0.90. If this ratio is too low, the ball tends to reduce flight distance when hit at high head speeds. Inversely, if this ratio is too high, the ball tends to reduce flight distance when hit at low head speeds.

Now referring to FIG. 1, the methods of calculating HDOV and LDOV are described in further detail. It is assumed that a dimple 10 has a diameter $D_1$ mm. A diameter range $R_1$ containing this diameter $D_1$ is determined from Table 1 or 2. For a dimple having a diameter of 4.1 mm, for example, its diameter range is range No. 3 in Table 1 or 2. The dimple is horizontally divided or sliced at the position of a depth corresponding to a diameter $D_2$ mm equal to the lower limit of the diameter range $R_1$ (the lower limit of range No. 3 for the diameter of 4.1 mm is 4.0 mm), to define a first slice zone $A_1$ of flat frustoconical shape having the diameters $D_1$ and $D_2$ (diameters 4.1 mm and 4.0 mm in the illustrated example). The volume $B_1$ mm$^3$ of the slice zone $A_1$ is determined, and this volume $B_1$ is multiplied by a coefficient corresponding to the diameter range $R_1$, that is, $\alpha_1$ in the case of HDOV or $\beta_1$ in the case of LDOV, to calculate a first imaginary slice volume $V_1$ mm$^3$ in the case of HDOV or $v_1$ in the case of LDOV. Specifically in the illustrated example, the coefficient for diameter range No. 3 is 1.00 in the case of HDOV and 0.40 in the case of LDOV, and the volume $B_1$ mm$^3$ is multiplied by these coefficients to calculate first imaginary slice volumes $V_1$ mm$^3$ and $v_1$ mm$^3$, respectively.

Next, the dimple 10 is horizontally sliced at the position of a depth corresponding to a diameter $D_3$ mm equal to the lower limit of the diameter range $R_2$ which is given one row below the preceding diameter range $R_1$ in Table 1 or 2 (in the illustrated example, the diameter range $R_2$ is diameter range No. 4 which is given one row below diameter range No. 3, and the diameter $D_3$ is 3.8 mm which is the lower limit of diameter range No. 4), to define a second slice zone $A_2$ of flat frustoconical shape having the diameters $D_2$ and $D_3$ (diameters 4.0 mm and 3.7 mm in the illustrated example). The volume $B_2$ mm$^3$ of the slice zone $A_2$ is determined and, this volume $B_2$ mm$^3$ is multiplied by a coefficient $\alpha_2$ (in the case of HDOV) or $\beta_2$ (in the case of LDOV) corresponding to the diameter range $R_2$ to calculate a second imaginary slice volume $V_2$ mm$^3$ or $v_2$ mm$^3$. Specifically in the illustrated example, the coefficient for diameter range No. 4 is 1.00 in the case of HDOV and 0.60 in the case of LDOV, and the volume $B_2$ mm$^3$ is multiplied by these coefficients to calculate second imaginary slice volumes $V_2$ mm$^3$ and $v_2$ mm$^3$, respectively.

The same calculation procedure as above is repeated until diameter range No. 13. The imaginary slice volumes $V_3$ mm$^3$, $V_4$ mm$^3$, and so on (in the case of HDOV) and the imaginary slice volumes $v_3$ mm$^3$, $v_4$ mm$^3$, and so on (in the case of LDOV) for respective diameter ranges are calculated.

For the final diameter range $R_n$, that is, diameter range No. 14 with a diameter of less than 2 mm, the volume $B_n$ mm$^3$ of the slice zone $A_n$ is similarly determined. The volume $B_n$ mm$^3$ is multiplied by a coefficient $\alpha_n$ or $\beta_n$ corresponding to the diameter range, specifically a coefficient of 0.20 in the case of HDOV or 0.50 in the case of LDOV, to calculate imaginary slice volume $V_n$ mm$^3$ in the case of HDOV or $v_n$ mm$^3$ in the case of LDOV.

HDOV of the above-specified dimple is the sum of imaginary slice volumes $V_1$, $V_2$, $V_3$, $V_4$, ..., $V_n$ mm$^3$ of respective slice zones $A_1$, $A_2$, $A_3$, $A_4$, ..., $A_n$; and LDOV is the sum of imaginary slice volumes $v_1$, $v_2$, $v_3$, $v_4$, ..., $v_n$ mm$^3$ of respective slice zones $A_1$, $A_2$, $A_3$, $A_4$, ..., $A_n$, as represented by the following equations.

$$HDOV\ (mm^3) = V_1 + V_2 + V_3 + V_4 + \ldots + V_n$$

$$LDOV\ (mm^3) = v_1 + v_2 + v_3 + v_4 + \ldots + v_n$$

The sum of HDOV's thus calculated for respective dimples is the overall HDOV, and the sum of LDOV's calculated for respective dimples is the overall LDOV.

Figure 2:
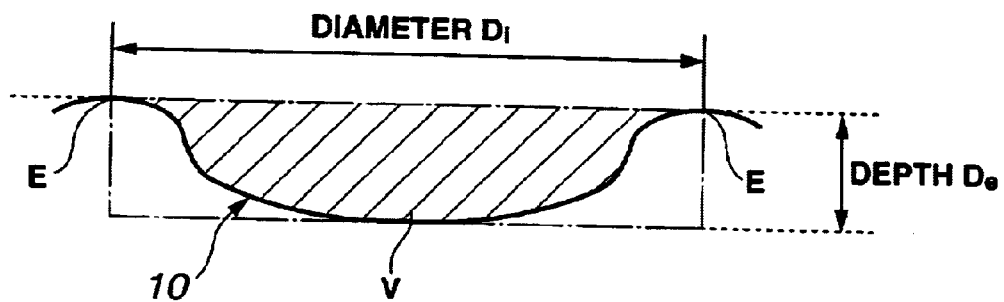
FIG. 2 is a schematic illustration of a dimple shape according to the invention.

According to the invention, in an elevational cross section taken at the center of a dimple 10 as shown in FIG. 2 wherein the left and right highest points in the figure are positioned on a horizontal line and these highest points are designated dimple edges E and E, the dimple 10 has a diameter $D_1$ which is equal to the distance between the dimple edges E and E. The dimple 10 has a depth De which is equal to the distance from a line segment connecting the edges E and E to the deepest bottom of the dimple. Then the dimple has a volume V which is the volume of a dimple portion delimited by the edges. It is understood that the dimple volume V mm$^3$ is the sum of volumes $B_1$, $B_2$, $B_3$, $B_4$, ..., $B_n$ mm$^3$ of respective slice zones $A_1$, $A_2$, $A_3$, $A_4$, ..., $A_n$.

$$V\ (mm^3) = B_1 + B_2 + B_3 + B_4 + \ldots + B_n$$

Also, the overall dimple volume is the sum of volumes of respective dimples.

It is noted that the horizontal direction assumed in the methods of calculating HDOV and LDOV designates a direction parallel to a line connecting the dimple edges E and E in FIG. 2.

According to the invention, the overall dimple volume is preferably at least 260 mm$^3$, more preferably at least 270 mm$^3$, further preferably at least 280 mm$^3$ and up to 360 mm$^3$, more preferably up to 350 mm$^3$, further preferably up to 340 mm$^3$, most preferably up to 330 mm$^3$. With too small an overall dimple volume, the ball tends to fly with a skying trajectory that is insufficient to gain a run and readily affected by the wind. Inversely, with too large an overall dimple volume, the ball tends to fly with a too low trajectory to a short carry and fluctuate.

It is noted that the shape of dimples used herein is generally circular in plane. Preferably the dimples have a diameter of at least 1.8 mm, more preferably at least 2.4 mm, further preferably at least 3.0 mm and up to 4.6 mm, more preferably up to 4.4 mm, further preferably up to 4.2 mm. Preferably the dimples have a depth of at least 0.08 mm, more preferably at least 0.10 mm, further preferably at least 0.12 mm and up to 0.22 mm, more preferably up to 0.20 mm, further preferably up to 0.19 mm.

The total number of dimples (n) is usually at least 360, preferably at least 370, further preferably at least 380 and at most 540, preferably at most 500, further preferably at most 450. Preferred for the dimples used herein are combinations of dimples of at least two types, more preferably at least three types, which are different in diameter, and up to six types, especially up to five types which are different in diameter. These dimples may also be different in depth. Therefore, combinations of dimples of at least three types, and up to ten types, especially up to eight types which are different in VT are preferable.

For the arrangement of the above-described dimples, any well-known technique may be used, and no particular limit is imposed as long as the dimples are evenly distributed. There may be employed any of the octahedral arrangement, icosahedral arrangement, and sphere division techniques of equally dividing a hemisphere into 2 to 6 regions wherein dimples are distributed in the divided regions. Fine adjustments or modifications may be made on these techniques. It is also preferred herein that the dimple surface coverage is 69 to 82%, especially 72 to 77%.

The golf ball of the invention is generally completed as a product by further coating the cover with a paint. It is preferable that the golf ball of the invention is formed so as to experience a compression deformation when the load which varies from an initial load of 98 N (10 kgf) to a final load of 1275 N (130 kgf) is applied to the ball, (referred to as $\mu$ hardness, hereinafter), of at least 2.0 mm, preferably at least 2.2 mm, more preferably at least 2.5 mm and up to 4.0 mm, preferably up to 3.7 mm, more preferably up to 3.5 mm. Too low a $\mu$ hardness tends to give a hard feel whereas too high a $\mu$ hardness may result in durability and resilience declines.

The diameter and weight of the golf ball of the invention comply with the Rules of Golf. The ball is formed to a diameter in the range of at least 42.67 mm and preferably up to 44 mm, more preferably up to 43.5 mm and further preferably up to 43 mm. The weight is not more than 45.92 grams and preferably at least 44.5 g, more preferably at least 44.8 g, further preferably at least 45.0 g and most preferably at least 45.1 g.

EXAMPLE

Examples and comparative examples are given below for illustrating the invention, though the invention is not limited to these examples.

Examples & Comparative Examples

Three-piece solid golf balls as shown in Tables 9 and 10 were conventionally prepared by furnishing a solid core as shown in Tables 3 and 4, successively forming a cover inner layer as shown in Table 5 and a cover outer layer as shown in Table 6 on the solid core, and uniformly forming dimples as shown in Tables 7 and 8. In the case of golf balls using an adhesive, an adhesive as shown below was used in a well-known manner.

Examples 1, 2, Comparative Example 1

Resamine D6208 (Dainichi Seika Kogyo K.K., Urethane Resin Base Adhesive)

Examples 3, 4, 5

RB182 Primer (Nippon Bee Chemical K.K., Chlorinated Polyolefin Base Adhesive)

The golf balls thus obtained were subjected to flight tests according to the following procedures and examined for spin rate, feel, scraping resistance and continuous durability. The results are shown in Tables 9 and 10.

Flight Test

Using a swing robot manufactured by Miyamae K.K., 20 balls of each Example were hit with a driver (#W1) at a head speed (HS) of 50 m/s. A carry and total distance were measured.

Club Used

Head: manufactured by Bridgestone Sports Co., Ltd., J's METAL, loft angle 7.5°,
  SUS630 stainless steel, lost wax process
Shaft: Harmotech Pro, HM-70, LK (low kick point), hardness X Spin The spin rate was calculated by hitting the ball with a driver (#W1) or a sand wedge (#SW) at a head speed (HS) of 20 m/s, photographing the behavior of the ball immediately after the impact, and carrying out image analysis.

Feel

Three professional golfers actually hit the ball with a drive (#W1) or a putter (#PT) and rated the feel according to the following criteria.

◯: soft

Δ: somewhat hard

×: hard

Scraping Resistance

The ball was hit at two arbitrary points with a sand wedge (#SW) at a head speed of 38 m/s using a swing robot, and visually observed and rated.

◎: very good

◯: good

Δ: ordinary

×: poor

Durability Against Consecutive Strikes

The ball was consecutively hit at a head speed of 38 m/s using a flywheel hitting machine, and rated in terms of the number of hits until the ball failed.

◯: good

Δ: ordinary

×: poor

It is noted that the ingredients described in Tables 3 to 10 are as follows.
(1) Dicumyl peroxide: Percumyl D, by NOF K.K.
(2) Peroxide: Luperco 101XL, by Elf Atochem
Antioxidant 1: Nocrack NS6, by Ohuchi Shinko Chemical K.K.
Antioxidant 2: Yoshinox 425, by Yoshitomi Pharmaceuticals K.K.
Liquid monomer SR-351: trimethylolpropane triacrylate (TMPTA), by Sartomer Co.
Dynalon: hydrogenated polybutadiene, by JSR Nucrel: ethylene-methacrylic acid-acrylate copolymer or ethylene-methacrylic acid copolymer, by Dupont-Mitsui Polychemical K.K.

Hytrel: thermoplastic polyester elastomer, by Dupont-Toray K.K.

Surlyn: ionomer resin, by E. I. Dupont

Himilan: ionomer resin, by Dupont-Mitsui Polychemical K.K. (The neutralizing metal is shown in the parentheses following Surlyn and Himilan.)

Polybutadiene: JSR BR11, by JSR

Pandex: thermoplastic polyurethane elastomer, by Bayer-DIC Polymer K.K.

Toughtec: glycidyl methacrylate adduct of hydrogenated styrene-butadiene-styrene block copolymer, by Asahi Chemical Industry K.K.

Bondyne: glycidyl methacrylate adduct of hydrogenated ethylene-ethyl acrylate-maleic anhydride copolymer, by Sumitomo Chemical K.K.

Diphenylmethane diisocyanate: by Nippon Polyurethane K.K.

Dicyclohexylmethane diisocyanate: by Bayer-Sumitomo Urethane K.K.

Trans-polyisoprene: TP-301, by Kurare K.K.

(3) Peroxide: Varox 230XL, by Elf Atochem

TABLE 3

| Core composition (pbw) | | | E1 | E2 | E3 | E4 | E5 | E6 |
|---|---|---|---|---|---|---|---|---|
| Polybutadiene | | | 100 | 100 | 100 | 100 | 100 | 100 |
| (1) Dicumyl peroxide | | | 1.2 | 1.2 | 1.2 | 1.2 | 1.2 | 1.2 |
| Barium sulfate | | | 12.9 | 12.9 | 13.3 | 12.3 | 15.8 | 24.4 |
| Zinc white | | | 5 | 5 | 5 | 5 | 5 | 5 |
| Antioxidant 1 | | | 0.2 | 0.2 | 0.2 | 0.2 | 0.2 | 0.2 |
| Zinc salt of pentachlorothiophenol | | | 1 | 1 | 1 | 1 | 1 | 1 |
| Zinc diacrylate | | | 25.9 | 25.9 | 27.4 | 29.6 | 19.0 | 25.9 |
| Vulcan-izing condi-tions | 1st stage | Temp. (° C.) | 145 | 145 | 135 | 135 | 135 | 150 |
| | | Time (min) | 30 | 30 | 40 | 40 | 40 | 25 |
| | 2nd stage | Temp. (° C.) | | | | 170 | 170 | 170 |
| | | Time (min) | | | | 10 | 10 | 10 |

TABLE 4

| Core composition (pbw) | | | CE1 | CE2 | CE3 | CE4 | CE5 | CE6 | CE7 | CE8 | CE9 | CE10 |
|---|---|---|---|---|---|---|---|---|---|---|---|---|
| Polybutadiene | | | 100 | 100 | 100 | 100 | 100 | 100 | 100 | 100 | 100 | 100 |
| (1) Dicumyl peroxide | | | 1.2 | 1.2 | | | | | | 1.2 | 1.2 | 1.2 |
| (2) Peroxide | | | | | 0.8 | 1 | 1.2 | 1 | 1.2 | | | |
| Barium sulfate | | | 0.7 | 47.2 | | | | | | 24.0 | 12.3 | 9.8 |
| Zinc white | | | 3.8 | 5 | 35 | 32.8 | 5 | 20.7 | 18.5 | 5 | 5 | 5 |
| Antioxidant 1 | | | 0.2 | 0.2 | 0.8 | | | | | 0.2 | 0.2 | 0.2 |
| Antioxidant 2 | | | | | | | 0.5 | 0.5 | 0.5 | | | |
| Liquid monomer SR-351 | | | | | | 5 | | | | | | |
| Zinc salt of pentachlorothiophenol | | | 1 | 1 | | | | | | 1 | 1 | 1 |
| Zinc diacrylate | | | 39.2 | 35.5 | 29.6 | 26.0 | 26.0 | 22.0 | 25.9 | 27.4 | 29.6 | 31.8 |
| Vulcanizing conditions | 1st stage | Temp. (° C.) | 155 | 160 | 145 | 140 | 140 | 140 | 145 | 160 | 160 | 160 |
| | | Time (min) | 15 | 16 | 25 | 22 | 22 | 30 | 25 | 16 | 16 | 16 |
| | 2nd stage | Temp. (° C.) | | | 165 | 165 | 165 | 165 | 165 | | | |
| | | Time (min) | | | 5 | 8 | 8 | 8 | 5 | | | |

TABLE 5

| Cover inner layer material (pbw) | a | b | c | d | e | f | g | h | i | j | k |
|---|---|---|---|---|---|---|---|---|---|---|---|
| Dyanlon 6100P | 30 | | 30 | | | | | | | | 48 |
| Nucrel AN4311 | 25 | | | | | | | | | | |
| Hytrel 4047 | | | | | 100 | | | | | | |
| Surlyn 9945 (Zn) | | | 35 | | | | | | | | 26 |
| Surlyn 8945 (Na) | | | 35 | | | | | | | | 26 |
| Surlyn 7930 (Li) | 22.5 | | | | | | | | | | |
| Surlyn 8940 (Na) | | | | | | 75 | | | | | |
| Surlyn 9910 (Zn) | | | | | | 25 | | | | | |
| Himilan AM7311 (Mg) | 22.5 | | | | | | | | | | |
| Himilan 1557 (Zn) | | 50 | | | | | | | | | |
| Himilan 1707 (Zn) | | | | | | | 30 | | | | |
| Himilan 1605 (Na) | | 50 | | 50 | | | 40 | | | | |
| Himilan 1706 (Zn) | | | | 50 | | | 30 | | | | |
| Titanium dioxide | 4.5 | 2.4 | 5.1 | 2.4 | | 5.1 | 5.1 | | | | 5.1 |
| Polybutadiene | | | | | | | | 100 | 100 | 100 | |
| Zinc diacrylate | | | | | | | | 30 | 19 | 40 | |
| Zinc white | | | | | | | | 9 | 21.8 | 12.5 | |
| Antioxidant 2 | | | | | | | | 0.5 | 0.5 | 0.5 | |
| (1) Dicumyl peroxide | | | | | | | | 2 | 1 | 1.5 | |
| Tungsten | | | | | | | | 30 | | | |

TABLE 5-continued

| Cover inner layer material (pbw) | | a | b | c | d | e | f | g | h | i | j | k |
|---|---|---|---|---|---|---|---|---|---|---|---|---|
| Vulcanizing conditions | Temp. (° C.) | | | | | | | | 150 | 150 | 160 | |
| | Time (min) | | | | | | | | 20 | 20 | 20 | |

TABLE 6

| Cover outer layer material (pbw) | | A | B | C | D | E | F | G | H | I | J |
|---|---|---|---|---|---|---|---|---|---|---|---|
| Resin Composition | Pandex TR3080 | | 30 | 50 | | | | | | | |
| | Pandex T7298 | 100 | 70 | 50 | | | | | | | |
| | Nucrel AN4212C | | | | 30 | | | | | | |
| | Himilan AD8511 | | | | | | | | | 25 | |
| | Himilan AD8512 | | | | | | | | | 25 | |
| | Surlyn 8120 | | | | | 50 | | | | | |
| | Himilan 1605 | | | | 20 | | | 50 | 35 | | |
| | Himilan 1650 | | | | | 50 | | | | | |
| | Himilan 1706 | | | | 20 | | | 50 | 30 | | |
| | Himilan 1855 | | | | 30 | | | | | 20 | 50 |
| | Himilan 1856 | | | | | | | | | | 50 |
| | Himilan AM7317 | | | | | | | | 35 | | |
| | Toughtec Z514 | | | | | | | | | 20 | |
| | Bondyne AX8396 | | | | | | | | | 10 | |
| | Titanium dioxide | 2.7 | 2.7 | 2.7 | 4 | 5.1 | | 4 | 4 | 4 | 5.1 |
| | Diphenylmethane diisocyanate | 1.0 | | | | | | | | | |
| | Dicyclohexyl-methane diisocyanate | | 1.5 | 1.5 | | | | | | | |
| Rubber composition | Trans-polyisoprene TP-301 | | | | | | 60 | | | | |
| | Polybutadiene | | | | | | 40 | | | | |
| | Zinc oxide | | | | | | 5 | | | | |
| | Titanium dioxide | | | | | | 17 | | | | |
| | Ultramarine blue color | | | | | | 0.5 | | | | |
| | Zinc diacrylate | | | | | | 35 | | | | |
| | (3) Peroxide Varox 230XL | | | | | | 2.5 | | | | |
| Vulcanizing conditions | Temp. (° C.) | | | | | | 150 | | | | |
| | Time (min) | | | | | | 8 | | | | |

TABLE 7

| | | Example | | | | | |
|---|---|---|---|---|---|---|---|
| | Dimples | 1 | 2 | 3 | 4 | 5 | 6 |
| (1) | Number | 72 | 72 | 72 | 72 | 72 | 72 |
| | Diameter (mm) | 4.080 | 4.040 | 4.100 | 4.100 | 4.040 | 4.080 |
| | Depth (mm) | 0.161 | 0.167 | 0.163 | 0.163 | 0.167 | 0.161 |
| | Volume (mm$^3$) | 1.077 | 0.876 | 1.077 | 1.077 | 0.876 | 1.077 |
| | HDOV (mm$^3$) | 0.873 | 0.606 | 0.877 | 0.877 | 0.606 | 0.873 |
| | LDOV (mm$^3$) | 0.842 | 0.724 | 0.844 | 0.844 | 0.724 | 0.842 |
| (2) | Number | 200 | 200 | 200 | 200 | 200 | 200 |
| | Diameter (mm) | 3.920 | 3.940 | 3.950 | 3.950 | 3.940 | 3.920 |
| | Depth (mm) | 0.152 | 0.155 | 0.154 | 0.154 | 0.155 | 0.152 |
| | Volume (mm$^3$) | 0.877 | 0.779 | 0.898 | 0.898 | 0.779 | 0.877 |
| | HDOV (mm$^3$) | 0.658 | 0.523 | 0.681 | 0.681 | 0.523 | 0.658 |
| | LDOV (mm$^3$) | 0.732 | 0.650 | 0.748 | 0.748 | 0.650 | 0.732 |
| (3) | Number | 120 | 120 | 120 | 120 | 120 | 120 |
| | Diameter (mm) | 3.140 | 3.180 | 3.140 | 3.140 | 3.180 | 3.140 |
| | Depth (mm) | 0.128 | 0.129 | 0.128 | 0.128 | 0.129 | 0.128 |
| | Volume (mm$^3$) | 0.443 | 0.457 | 0.477 | 0.477 | 0.457 | 0.443 |
| | HDOV (mm$^3$) | 0.211 | 0.225 | 0.241 | 0.241 | 0.225 | 0.211 |
| | LDOV (mm$^3$) | 0.368 | 0.376 | 0.408 | 0.408 | 0.376 | 0.368 |
| Total number of dimples | | 392 | 392 | 392 | 392 | 392 | 392 |
| Overall volume (mm$^3$) | | 306.0 | 273.7 | 314.4 | 314.4 | 273.7 | 306.0 |
| Overall HDOV (mm$^3$) | | 219.8 | 175.2 | 228.3 | 228.3 | 175.2 | 219.8 |
| Overall LDOV (mm$^3$) | | 251.2 | 227.2 | 259.3 | 259.3 | 227.2 | 251.2 |

TABLE 8

| Dimples | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| (1) | Number | 54 | 150 | 150 | 156 | 156 | 72 | 153 | 72 | 150 | 72 |
| | Diameter (mm) | 4.100 | 3.650 | 3.650 | 3.880 | 3.880 | 4.040 | 3.880 | 4.000 | 3.650 | 4.000 |
| | Depth (mm) | 0.210 | 0.148 | 0.148 | 0.203 | 0.203 | 0.177 | 0.203 | 0.190 | 0.148 | 0.190 |
| | Volume (mm$^3$) | 1.418 | 0.775 | 0.775 | 0.936 | 0.936 | 0.929 | 0.929 | 1.221 | 0.775 | 1.221 |
| | HDOV (mm$^3$) | 1.156 | 0.541 | 0.541 | 0.617 | 0.617 | 0.643 | 0.617 | 0.969 | 0.541 | 0.969 |
| | LDOV (mm$^3$) | 1.099 | 0.683 | 0.683 | 0.781 | 0.781 | 0.767 | 0.781 | 0.987 | 0.683 | 0.987 |
| (2) | Number | 174 | 210 | 210 | 204 | 204 | 200 | 204 | 200 | 210 | 200 |
| | Diameter (mm) | 3.850 | 3.500 | 3.500 | 3.640 | 3.640 | 3.840 | 3.640 | 3.850 | 3.500 | 3.850 |
| | Depth (mm) | 0.210 | 0.148 | 0.148 | 0.214 | 0.214 | 0.150 | 0.214 | 0.180 | 0.148 | 0.180 |
| | Volume (mm$^3$) | 1.168 | 0.678 | 0.678 | 0.917 | 0.917 | 0.716 | 0.917 | 1.072 | 0.678 | 1.072 |
| | HDOV (mm$^3$) | 0.855 | 0.405 | 0.405 | 0.562 | 0.562 | 0.462 | 0.562 | 0.810 | 0.405 | 0.810 |
| | LDOV (mm$^3$) | 0.931 | 0.569 | 0.569 | 0.786 | 0.786 | 0.604 | 0.786 | 0.902 | 0.569 | 0.902 |
| (3) | Number | 132 | | | 60 | 60 | 120 | 60 | 120 | | 120 |
| | Diameter (mm) | 3.400 | | | 2.840 | 2.840 | 3.100 | 2.840 | 3.400 | | 3.400 |
| | Depth (mm) | 0.210 | | | 0.220 | 0.220 | 0.139 | 0.220 | 0.170 | | 0.170 |
| | Volume (mm$^3$) | 0.852 | | | 0.595 | 0.595 | 0.439 | 0.595 | 0.789 | | 0.789 |
| | HDOV (mm$^3$) | 0.481 | | | 0.219 | 0.219 | 0.191 | 0.219 | 0.492 | | 0.492 |
| | LDOV (mm$^3$) | 0.739 | | | 0.438 | 0.438 | 0.347 | 0.438 | 0.705 | | 0.705 |
| Total number of dimples | | 360 | 360 | 360 | 420 | 420 | 392 | 420 | 392 | 360 | 392 |
| Overall volume (mm$^3$) | | 392.3 | 258.6 | 258.6 | 368.7 | 368.7 | 262.8 | 368.7 | 397.0 | 258.6 | 397.0 |
| Overall HDOV (mm$^3$) | | 274.7 | 166.2 | 166.2 | 224.0 | 224.0 | 161.6 | 224.0 | 290.8 | 166.2 | 290.8 |
| Overall LDOV (mm$^3$) | | 318.9 | 221.9 | 221.9 | 308.5 | 308.5 | 217.7 | 308.5 | 336.1 | 221.9 | 336.1 |

TABLE 9

| | | Example | | | | | |
|---|---|---|---|---|---|---|---|
| | | 1 | 2 | 3 | 4 | 5 | 6 |
| Core | Outer diameter (mm) | 36.60 | 36.60 | 36.40 | 36.60 | 36.60 | 36.50 |
| | JIS C hardness | | | | | | |
| | Center | 71.0 | 71.0 | 73.0 | 76.0 | 59.0 | 71.5 |
| | 10 mm from center | 72.0 | 72.0 | 74.0 | 76.1 | 60.0 | 72.5 |
| | Surface | 73.0 | 73.0 | 74.3 | 76.1 | 60.6 | 73.0 |
| | Maximum hardness difference (%) | 2.8 | 2.8 | 1.8 | 0.1 | 2.7 | 2.1 |
| | Specific gravity | 1.147 | 1.147 | 1.153 | 1.153 | 1.146 | 1.211 |
| Cover inner layer | Type | a | b | c | c | d | c |
| | JIS-C hardness | 76 | 86 | 82 | 82 | 88 | 82 |
| | Specific gravity | 0.97 | 0.97 | 0.96 | 0.96 | 0.97 | 0.96 |
| | Gage (mm) | 1.60 | 1.60 | 1.65 | 1.55 | 1.55 | 1.60 |
| Adhesive | | applied | applied | applied | applied | applied | no |
| Cover outer layer | Type | A | B | C | A | C | D |
| | Specific gravity | 1.183 | 1.183 | 1.183 | 1.183 | 1.183 | 0.980 |
| | Gage (mm) | 1.47 | 1.45 | 1.51 | 1.49 | 1.50 | 1.51 |
| | JIS-C hardness | 75 | 71 | 69 | 75 | 69 | 74 |
| Ball | Weight (g) | 45.38 | 45.30 | 45.35 | 45.35 | 45.30 | 45.30 |
| | Outer diameter (mm) | 42.73 | 42.70 | 42.71 | 42.68 | 42.70 | 42.72 |
| #W1/ HS50 | Carry (m) | 226.5 | 227.0 | 227.0 | 231.5 | 231.0 | 225.0 |
| | Total (m) | 256.0 | 257.5 | 257.0 | 259.0 | 258.0 | 256.0 |
| | Spin (rpm) | 3050 | 3011 | 3123 | 3061 | 2906 | 3025 |
| | Feel | ○ | ○ | ○ | ○ | ○ | ○ |
| | Trajectory | low, somewhat rising, stretching trajectory | somewhat high, but stretching trajectory | low, stretching trajectory | low, stretching trajectory | somewhat high, but stretching trajectory | low, somewhat rising, stretching trajectory |
| #SW/HS20 approach spin (rpm) | | 6302 | 6361 | 6275 | 6095 | 6285 | 6229 |
| #PT feel | | ○ | ○ | ○ | ○ | ○ | ○ |
| Scraping resistance | | ○ | ○ | ◉ | ◉ | ○ | ○ |
| Durability against consecutive strikes | | ○ | ○ | ○ | ○ | ○ | ○ |

TABLE 10

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Core | Outer diameter (mm) | 35.50 | 31.50 | 38.10 | 35.10 | 33.00 | 36.00 | 34.90 | 36.50 | 36.60 | 35.50 |
| | JIS C hardness | | | | | | | | | | |
| | Center | 68.0 | 63.0 | 66.0 | 71.3 | 74.0 | 74.0 | 63.0 | 55.0 | 58.0 | 59.0 |
| | 10 mm from center | 78.0 | 75.0 | 72.0 | 69.3 | 74.0 | 73.5 | 70.0 | 68.0 | 70.0 | 70.0 |
| | Surface | 84.2 | 81.1 | 76.1 | 67.9 | 74.0 | 73.0 | 73.0 | 74.3 | 76.1 | 78.0 |
| | Maximum hardness difference (%) | 23.8 | 28.7 | 15.3 | 5.0 | 0.0 | 1.4 | 15.9 | 35.1 | 31.2 | 32.2 |
| | Specific gravity | 1.107 | 1.345 | 1.177 | 1.240 | 1.100 | 1.172 | 1.155 | 1.212 | 1.153 | 1.145 |
| Cover inner layer | Type | e | d | f | g | h | i | j | b | k | d |
| | JIS-C hardness | 64 | 88 | 86 | 90 | 77 | 67 | 96 | 86 | 76 | 88 |
| | Specific gravity | 1.12 | 0.98 | 0.98 | 0.98 | 1.29 | 1.16 | 1.15 | 0.97 | 0.95 | 0.98 |
| | Gage (mm) | 1.63 | 3.40 | 0.95 | 1.90 | 2.70 | 1.50 | 2.50 | 1.60 | 1.60 | 1.63 |
| Adhesive | | applied | no | no | no | no | no | no | no | no | no |
| Cover outer layer | Type | C | E | F | G | H | I | D | J | A | A |
| | Specific gravity | 1.183 | 0.980 | 0.980 | 0.980 | 0.980 | 0.980 | 0.980 | 0.980 | 1.183 | 1.183 |
| | Gage (mm) | 1.98 | 2.20 | 1.36 | 1.90 | 2.18 | 1.85 | 1.40 | 1.50 | 1.45 | 1.98 |
| | JIS-C hardness | 69 | 80 | 69 | 88 | 91 | 79 | 74 | 80 | 75 | 75 |
| Ball | Weight (g) | 45.40 | 45.30 | 45.30 | 45.30 | 45.12 | 45.30 | 45.30 | 45.35 | 45.30 | 45.30 |
| | Outer diameter (mm) | 42.70 | 42.70 | 42.72 | 42.70 | 42.76 | 42.70 | 42.70 | 42.70 | 42.70 | 42.70 |
| #W1/ HS50 | Carry (m) | 215.5 | 223.0 | 226.0 | 220.0 | 219.0 | 221.0 | 213.0 | 214.0 | 226.5 | 215.0 |
| | Total (m) | 243.0 | 252.0 | 250.5 | 248.0 | 247.0 | 248.0 | 242.5 | 244.0 | 249.0 | 245.0 |
| | Spin (rpm) | 3448 | 3100 | 3125 | 2625 | 2841 | 3110 | 2888 | 2885 | 3112 | 3050 |
| | Feel | X | X | Δ | X | X | ○ | ○ | Δ | ○ | Δ |
| | Trajectory | too low, dropping trajectory | High, skying trajectory | high, skying trajectory | low, dropping trajectory | low, dropping trajectory | Somewhat high, skying trajectory | low, dropping trajectory | too low, dropping trajectory | high, skying trajectory | too low, dropping trajectory |
| #SW/HS20 approach spin (rpm) | | 6352 | 6222 | 6152 | 4860 | 4795 | 6193 | 6086 | 5903 | 6111 | 6089 |
| #PT feel | | ○ | Δ | ○ | X | X | Δ | X | ○ | ○ | X |
| Scraping resistance | | Δ | X | X | ○ | ○ | Δ | X | ○ | ○ | X |
| Durability against consecutive strikes | | ○ | ○ | X | ○ | ○ | X | X | ○ | ○ | X |

As is evident from the above results, all multi-piece solid golf balls within the scope of the invention exhibit improved flight and spin performances, provide a satisfactory feel when hit with a driver, iron and putter, and have improved scraping resistance and durability.

In contrast, the multi-piece solid golf balls of Comparative Examples which lack some of the essential features of the invention have the following drawbacks.

Comparative Example 1 provided a poor feel upon driver shots, followed a too low, dropping trajectory and traveled short.

Comparative Example 2 provided a poor feel upon driver shots, followed a too high, skying trajectory and was inferior in distance. Scraping occurred.

Comparative Example 3 followed a too high, skying trajectory and was inferior in distance. The ball was scraped, less durable and low rebound. Manufacturing efficiency was low.

Comparative Example 4 followed a too low, dropping trajectory and traveled short. It showed a hard feel and poor spin performance upon putting.

Comparative Example 5 followed a too low, dropping trajectory and traveled short. It showed a hard feel and poor spin performance upon putting.

Comparative Example 6 followed a high, skying trajectory and traveled short. Durability was low.

Comparative Example 7 followed a low dropping trajectory and was inferior in feel upon putting, scraping resistance and durability.

Comparative Example 8 provided a poor feel upon driver shots, followed a too low, dropping trajectory and traveled short.

Comparative Example 9 followed a too high, skying trajectory and was inferior in flying distance.

Comparative Example 10 provided a poor feel upon putting and was scraped and less durable. It followed a too low, dropping trajectory and traveled short.

The multi-piece solid golf balls of the invention have the advantages of increased distance, ease of control, favorable feel, and durability.

What is claimed is:

1. A multi-piece solid golf ball comprising a solid core and a cover of two inner and outer layers enclosing the solid core and formed on the surface with a plurality of dimples, wherein said solid core in its entirety has a hardness distribution falling within the range if JIS-C hardness 50 to 85, wherein the difference between a maximum core JIS-C hardness and a minimum core JIS-C hardness divided by the minimum core JIS-C hardness is less than or equal to 5%, said cover inner layer has a JIS-C hardness of 70 to 90, said cover outer layer has a JIS-C hardness of 60 to 80, the sum of high-speed region dimple operative volumes HDOV of respective dimples is 170 to 310, the sum of low-speed region dimple operative volumes of respective dimples LDOV is 200 to 310, and the overall dimple volume is 260 to 360 mm$^3$.

2. The multi-piece solid golf ball of claim 1 wherein provided that (a) represents a surface JIS-C hardness of the core, (b) represents the JIS-C hardness of the cover inner layer, and (c) represents the JIS-C hardness of the cover outer layer, they satisfy the relationship: (a)≦(b)≧(c).

3. The multi-piece solid golf ball of claims 1 wherein said solid core has a specific gravity of 1.0 to 1.3, said cover inner layer has a specific gravity of 0.8 to 1.2, and said cover outer layer has a specific gravity of 0.9 to 1.3.

4. The multi-piece solid golf ball of claim 1 wherein said cover inner layer or cover outer layer is mainly formed of a thermoplastic resin.

5. The multi-piece solid golf ball of claim 1 wherein said cover outer layer is mainly formed of a thermoplastic polyurethane elastomer obtained using an aromatic or aliphatic diisocyanate.

6. The multi-piece solid golf ball of claim 1 wherein said cover outer layer is mainly formed of the reaction product of a thermoplastic polyurethane elastomer with an isocyanate compound.

7. The multi-piece solid golf ball of claim 1 wherein said cover inner layer is mainly formed of an ionomer resin or an ionomer resin and an olefinic elastomer.

8. The multi-piece solid golf ball of claim 1 wherein said cover inner layer and cover outer layer is mainly formed of a thermoplastic resin.

* * * * *